(12) United States Patent  (10) Patent No.: US 7,770,849 B2
Martin et al.  (45) Date of Patent: Aug. 10, 2010

(54) RIGIDLY ATTACHED CABLE SUPPORT FOR DUCTWORK HAVING AT LEAST THREE FLAT SIDE SURFACES

(75) Inventors: Stephen S. Martin, Huntington Station, NY (US); Kevin Grennan, Schaumburg, IL (US)

(73) Assignee: Duro Dyne Corporation, Bay Shore, NY (US)

( * ) Notice: Subject to any disclaimer, the term of this patent is extended or adjusted under 35 U.S.C. 154(b) by 0 days.

(21) Appl. No.: 12/235,026

(22) Filed: Sep. 22, 2008

(65) Prior Publication Data

US 2009/0078833 A1  Mar. 26, 2009

Related U.S. Application Data

(60) Provisional application No. 60/975,296, filed on Sep. 26, 2007.

(51) Int. Cl.
*F16L 3/08* (2006.01)
*F16G 11/00* (2006.01)

(52) U.S. Cl. ............ 248/65; 24/136 R; 24/115 L
(58) Field of Classification Search ............ 248/65, 248/300, 200, 74.1; 24/136 R, 115 R, 115 L, 24/115 M, 136 L
See application file for complete search history.

(56) References Cited

U.S. PATENT DOCUMENTS

| RE15,290 E | * | 2/1922 | Kemper et al. ............ 403/384 |
|---|---|---|---|
| 3,146,982 A | * | 9/1964 | Budnick .................. 248/68.1 |
| 3,672,706 A | | 6/1972 | Chilcoat |
| 4,591,127 A | * | 5/1986 | Tuvesson ................. 248/551 |
| 4,638,966 A | * | 1/1987 | Ford ....................... 248/62 |
| 5,080,199 A | * | 1/1992 | McCallum, III ........... 187/413 |
| 5,181,680 A | | 1/1993 | Coll |
| 6,546,600 B1 | | 4/2003 | Lyons |
| 6,669,156 B2 | * | 12/2003 | East et al. ............... 248/300 |
| 7,195,218 B2 | * | 3/2007 | James et al. ............. 248/251 |

* cited by examiner

*Primary Examiner*—Anita M King
(74) *Attorney, Agent, or Firm*—Barry G. Magidoff

(57) ABSTRACT

A cable clamp-bracket combination for rigidly connecting to an item to be suspended, especially a HVAC duct suspended from the ceiling of a structure. The combination utilizing, e.g., a commercially available cable clamp rigidly but removably connected to the clamp in a position where openings in the bracket surfaces mate with the cable channels through the clamp and a slot through the bracket mates with a clamp release projection on the clamp. The cable clamp includes a clamp clutch adjacent each cable channel for holding a support cable. The combination resulting in a rigid connection between the clamp and the item (e.g., duct) and a non-slip connection between the supporting cables and the item. The bracket can be formed from a flat plate having preformed openings and connecting elements by bending the plate into the desired form for holding the clamp and being securable to the, e.g., duct.

6 Claims, 5 Drawing Sheets

RIGIDLY ATTACHED CABLE SUPPORT FOR DUCTWORK HAVING AT LEAST THREE FLAT SIDE SURFACES

This application claims the benefit of the filing date of a provisional application having Ser. No. 60/975,296, which was filed on Sep. 26, 2007.

BACKGROUND OF THE INVENTION

This application is directed to the combination for creating a rigid connection between a clutch type cable clamp and a duct, where the duct comprises at least two pairs of opposed corners formed by at least three flat surfaces; the corners forming angles of less than 180 degrees to each other.

GENERAL STATEMENT OF THE INVENTION

Generally, this invention relates to a means for supporting flat surfaced ducts utilizing cables, where the connections to the duct are rigid connections and the second end of the cable is connected to a fixed support surface above the ducts, so that the duct is suspended from the higher surface by cables connected to the clutch type cable clamp.

It is an object of the present invention to provide a more stable connection where the cable clamp, by which a support cable is firmly but adjustably connected, has a rigid connection to the duct and thereby avoids undesired movement or sway that may otherwise occur at that connection. This connection allows a truly level support to be achieved merely by setting the relationship between the cables without having to be concerned with subsequent movement between the lower end of the cable and the duct.

BRIEF DESCRIPTION OF THE DRAWINGS

Referring to the drawings, the following examples present preferred embodiments to the present invention, but such embodiments are not to be taken as being exclusive and defining the full scope of this invention.

Exemplary, and preferred, embodiments of the invention are shown in the following drawings.

DETAILED DESCRIPTION OF THE DRAWINGS

Figure 1:
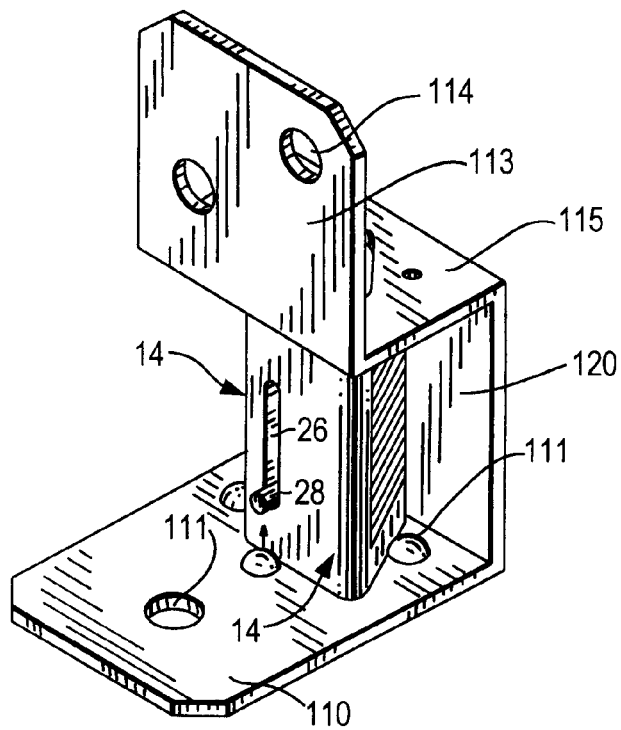
FIG. 1 is an isometric elevation view showing the clutch type cable clamp rigidly secured to a rigid angle connector and connected to an HVAC rectangular duct.
Figure 1A:
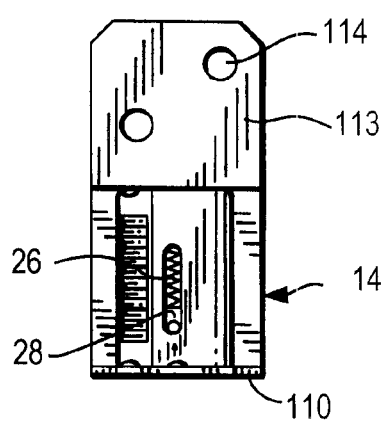
FIG. 1A is a front elevational view of the device of FIG. 1.
Figure 1B:
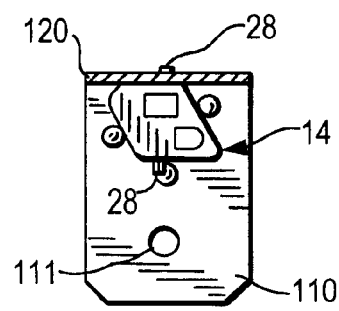
FIG. 1B is a cut-away top plan view of the device of FIG. 1.
Figure 2:
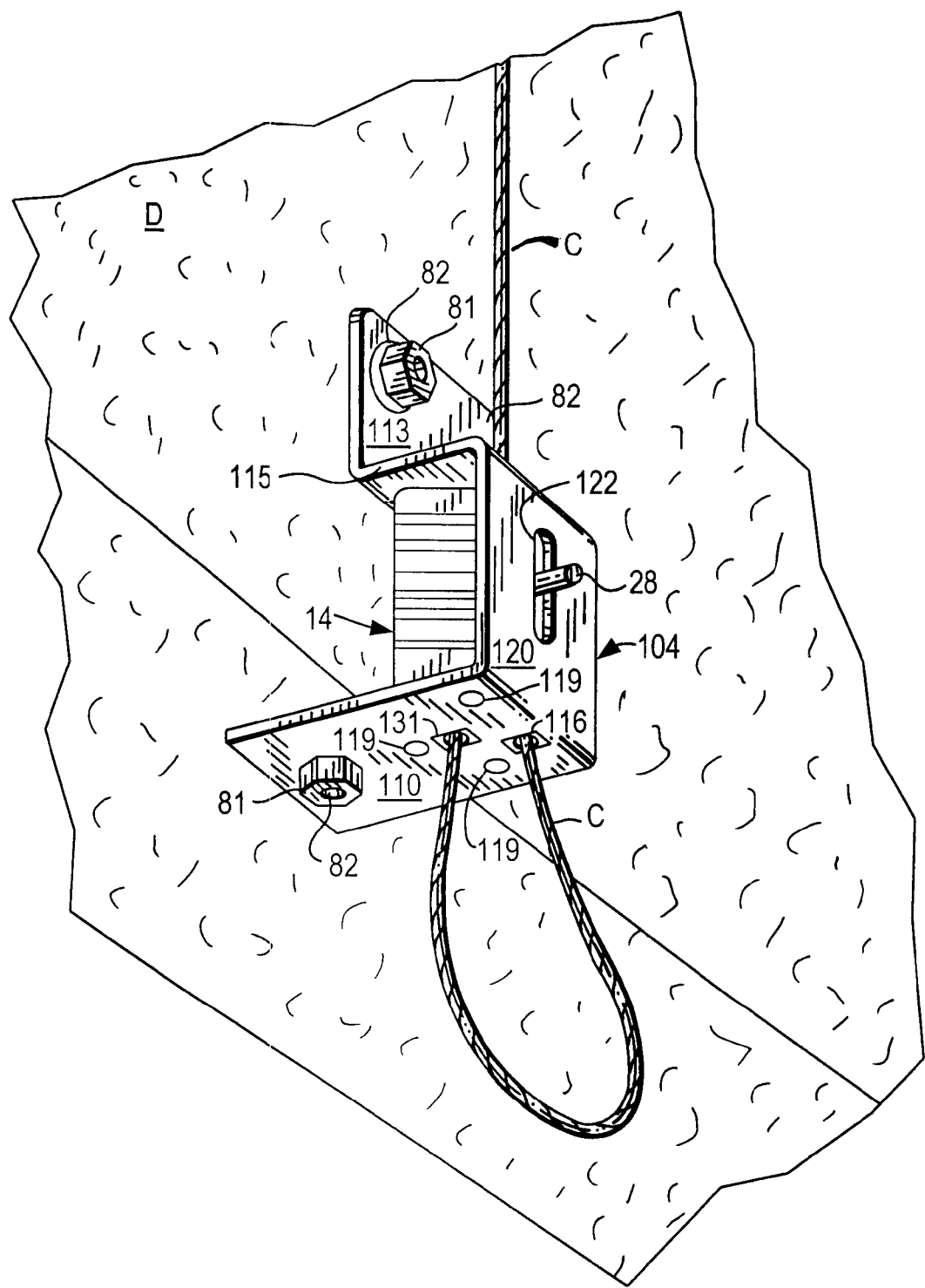
FIG. 2 is a bottom isometric view showing the attachment of the bracket/cable clamp combination to an HVAC rectangular duct.

Referring to FIGS. 1-6, a cable clamp generally indicated by the numeral 14 is rigidly secured to an angle bracket (generally indicated by the numeral 104), which in turn is intended to be rigidly secured to a bottom and side surface of a duct (see D, in FIG. 2). The angle bracket 104, in use, includes a first vertical section 113 intended to extend vertically at the top of the bracket 104, an upper horizontal member section 115 bent outwardly from the first vertical section 113; a lower vertical section 120 facing outwardly from the distal end of the upper horizontal section 115, and including an internal surface 122 defining a release opening, in this preferred embodiment an elongated slot extending longitudinally of the lower vertical section 120. A lower horizontal surface 110 is bent inwardly from the lower vertical section 120, in this embodiment extending substantially parallel to the upper horizontal surface 115.

Each of these four sections forming the brackets of these embodiments, in the example shown, extend at substantially right angles to each other, because they are intended to match the juxtapositions of the three lower sides of the duct D, as shown in FIG. 2; however, the angles between the bracket sections depend upon the angles between the sides of the item to be suspended. Thus, if the, e.g., duct sides are at other than right angles to each other, the angle between the sections 115 and 113, 115 and 120, and 120 and 110, can be other than a right angle, depending upon the angles between the sides of the duct D, or other item being suspended, and thus enable the upper vertical surface 113 and lower horizontal surface 110 to rest flat against the respective, e.g., duct, surfaces, as shown in FIG. 2. Alternatively, there can be another fold at section 110, along the line "Z", in FIG. 8, so that the end portion of section 110 can be at the necessary angle to lie flat along the bottom surface of the item being suspended.

For purposes of clarity, it should be understood that the term 'rigid connection' is to mean a connection that prevents relative movement between the clamped end of the cable and the duct, while the cable is clamped and the clamp is connected to the bracket and thus to the suspended item. However, a "rigid connection" also includes a connection that can be broken upon the application of sufficient force, without breaking the clamp or bracket.

The upper vertically extending surface 113 includes two or more holes for the passage of rigid connection members such as machine screws or nuts and bolts 81, 82, or rivets, or other rigid connection means to secure the bracket/clamp combination to the duct wall D. Similarly, the lower horizontally extending surface 110 can have one or more holes 111 extending through the plate, again to allow a machine screw or bolt, or rivet, or other connection means, to connect that surface rigidly to the bottom surface of a duct. Again, the angle between the lower horizontal surface 110 and the lower vertical surface 120 is shown as a right angle but, depending upon the angle between the surfaces of the duct, can be an angle ranging from an acute angle to an obtuse angle.

Figure 3:
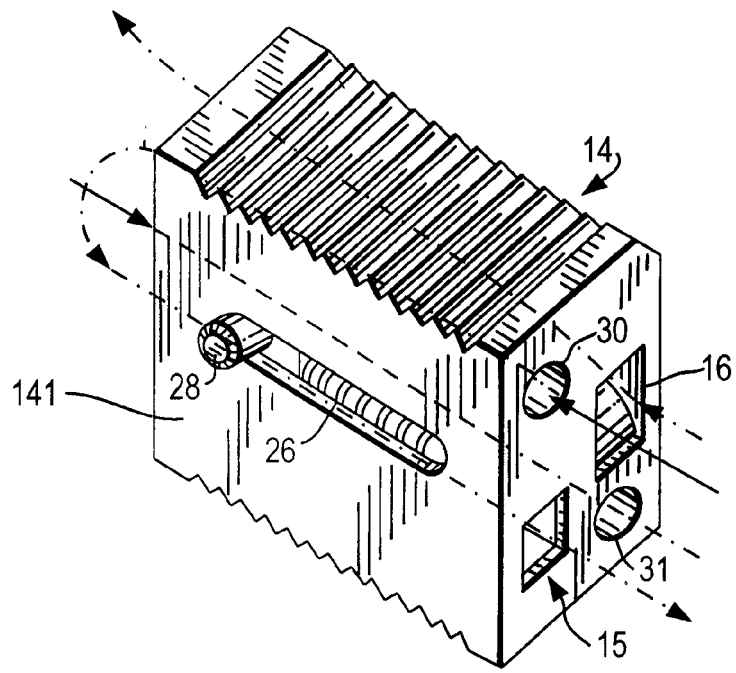
FIG. 3 is an isometric front view of a cable clamp useful for the present invention, as described in U.S. Pat. No. 6,546,600.
Figure 4:
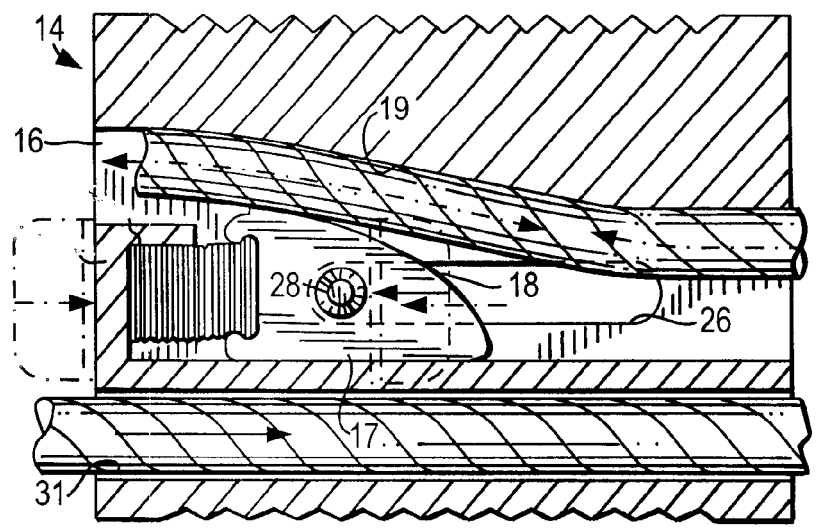
FIG. 4 is a magnified fragmentary vertical sectional view through the cable clamp of FIG. 3, with a cable inserted in the clamp.

The cable clamp 14, as preferably exemplified in the attached drawings, especially of FIGS. 3 and 4, is the clamp described in commonly owned U.S. Pat. No. 6,546,600, (the disclosure of which is incorporated herein, as if it had been repeated in its entirety).

The cable clamp 14 can be rigidly connected to the angle bracket 104 by, for example, the dimples 119, or convexities, shown on the two horizontal sections 115, 110, which mate with two corresponding depressions or (as shown) openings 30,31, at each end of the clamp 14, which provide internal surfaces which grip the convex surfaces of the dimples. Alternatively, the convexity can be on the clamp surface and the internal surface formed in the bracket section. The internal surface can be a portion of an opening extending through the surface, or merely a concavity in the surface. A more costly, but at least equally effective rigid connection would be achieved utilizing a rigid connector means such as a threaded bolt and a threaded internal surface. Of course, a permanent rigid connection can be achieved by welding or other bonding means.

The preferred clamp, as shown in the above recited U.S. Patent, has a pair of cable channels 17,19, each of which contains a cable clamp clutch 18 which may be retracted by a spring loaded handle 28, extending out through the slot opening 26 in each side surface. As shown, the clamp 14 has a substantially parallel quadrilateral cross-sectional outer shape, where the two ridged sides which extend parallel to the central channels 17,19 are parallel to each other, but at other than right angles to the other two vertical side surfaces 141, 142. This enables the clamp openings 16 to be more centrally located within the body of the clamp. The clamp clutch 18 within each of the openings can be operated without interfering with the other clamp clutch. The elongated slot 122 in the lower vertically extending section 120 of the bracket mates with the slot opening 26 in the clamp side, thus allowing retraction of the clamp clutch by manually operating the handle 28. Retracting the clamp clutch allows relative movement of the cable extending through the channel opening 16 and into the channel 19 in the clamp 14. This enables the vertical adjustment of a duct supported by the cables and clamp bracket combination from, for example, the ceiling of a building, after the bracket and clamp are secured to the duct wall and the cable threaded through the channel 19.

Alternative methods of rigidly connecting the clamp to the angle bracket include, for example, welding or by a threaded connection into the two slots extending longitudinally through the clamp body.

The clamp 14 and the bracket 104 are so juxtaposed that the retraction handle 28 on the clamp 1, extends outwardly through slot 122, allowing the clutch 18 to be moved so as to release cable C as it passes through the clamp 14. On the other hand, when the handle 28 is relaxed, the clutch 18 holds the cable so as to prevent any longitudinal relative movement of the clamp and cable, thus firmly holding the duct D in place. A series of identical bracket/clamp combinations are preferably placed on the opposing sides of the duct D spaced as necessary to allow support of the duct along its full length, the spacing depending upon the weight of the duct.

When it is desired to move the duct vertically up or down, it is necessary to move the handle, projection 28, in a downwardly direction which can be eased by the use of a pair of pliers as is shown in U.S. Pat. No. 6,546,600. The movable projection, or handle or pin 28 protruding from the face surface 141 of the clamp 14, in contact with the lower vertical section of the bracket should be sufficiently long as to protrude slightly beyond the outer surface of the bracket to allow ready contact and movement when it is desired to move the bracket relative to a cable.

The combination of this invention is readily and conveniently manufactured by combining the two major parts, the clamp and the bent bracket, together where the connection is formed, e.g. by dimples 119,219 extending inwardly towards the opposing horizontal surface on each of the two horizontal surfaces of the clamp 14, at least two dimples 119,219 being so juxtaposed as to extend into corresponding openings or depressions in the clamp ends 15; alternatively, convexities, or protrusions, can be added to the clamp end surfaces 15 and openings or depressions formed in the corresponding bracket sections. Referring to the drawings in U.S. Pat. No. 6,546,600 ("'600 Patent"), from FIGS. 1 and 3 of the '600 Patent it can be seen that these clamps 14 are manufactured with two extra channels indicated in FIGS. 1 and 3 of the '600 Patent as 30 and 31. In the preferred example, the dimples 119,219 in the horizontal surfaces of the bracket are so placed as to be juxtaposed opposite these two extra channels extending into the clamp when the clamp is inserted between the two horizontal surfaces of the bracket, i.e., surfaces 7 and 13. The dimples 119,219 extend into the openings and are restrained by the internal surfaces of the channel openings 30,31.

Figure 5:
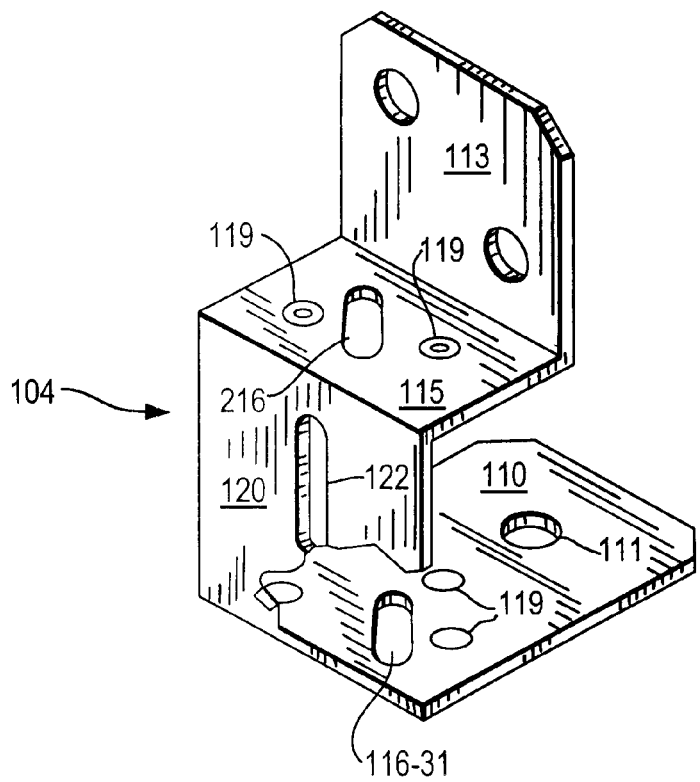
FIG. 5 is an isometric elevation view showing an example of an angle bracket of the present invention, before it is rigidly connected to a cable clamp.
Figure 6:
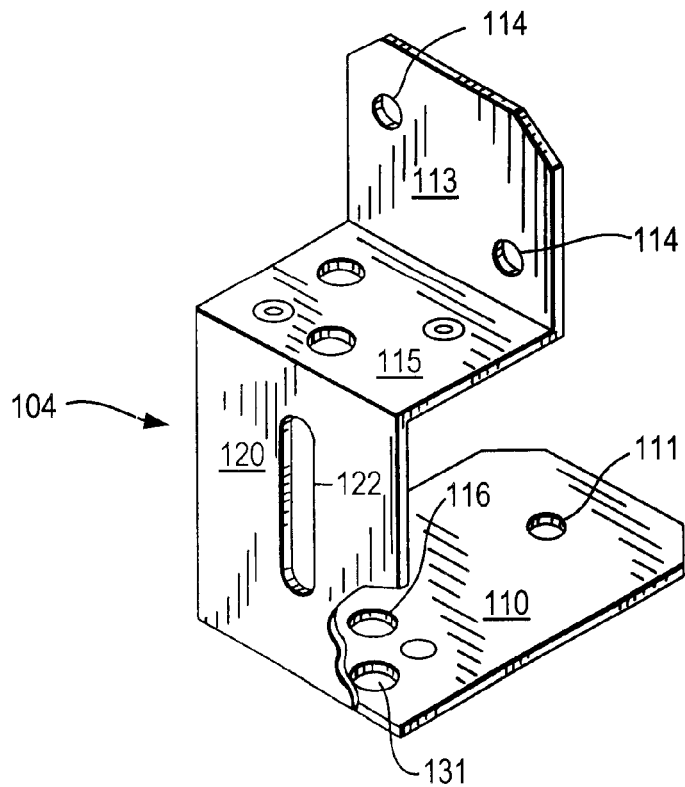
FIG. 6 is an isometric elevation view showing another example of an angle bracket of the present invention, before it is rigidly connected to a cable clamp, preferably of a larger size, for a larger cable.
Figure 7:
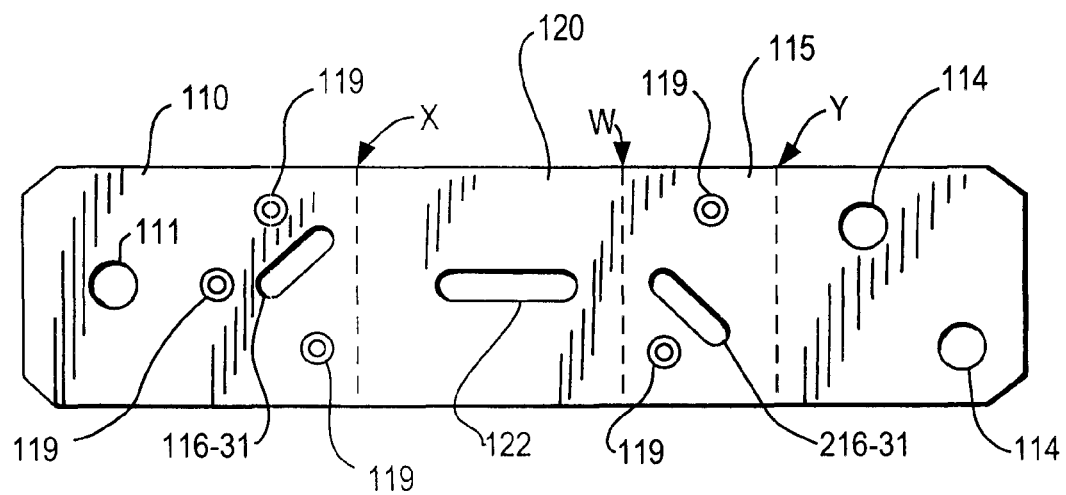
FIG. 7 is a plan view of an example of a flat plate which can be bent to form the angle bracket of FIG. 5.
Figure 8:
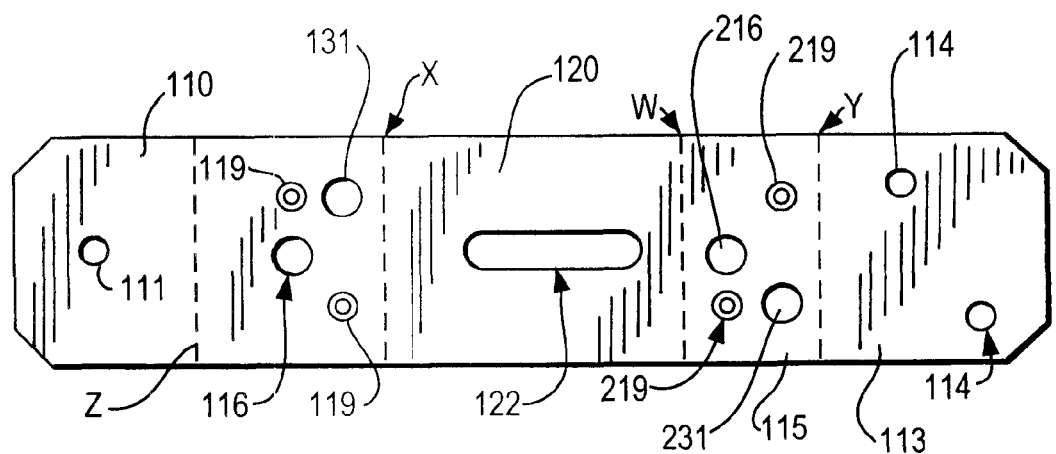
FIG. 8 is a plan view of another example of a larger flat plate which can be bent to form the angle bracket of FIG. 6.

The brackets of FIGS. 5 and 6 can be easily manufactured from a flat plate, as shown in FIGS. 7-8, for example. The several slots 116-31, 122, 216, 216-31, and 231, openings and dimples are formed in the plate, as shown. Although the plate is described as 'rigid', it can be bent at the indicated fold lines W, X, Y upon the use of sufficient force, and sometimes elevated temperature, to form, e.g., the bent bracket as shown for example in FIGS. 5 and 6, where the item to be suspended has sides and bottom surfaces at right angles to each other. Where the sides are juxtaposed at angles other than right angles, the bends of the plate should be such as to match the angles of the item, in order to allow the surfaces of sections 110 and 113 to be parallel to the bottom and side surfaces, respectively, when rigidly attached to the clamp and the suspended item. When the surfaces of the suspended item are juxtaposed at large angles, or very small angles, in order to allow the cables held by the clamps 14 to have clearance up to the higher support surface, it may be necessary to vary the lengths of different sections, e.g., lengthening the lower support section 110 and upper horizontal section 115, to allow the cables to extend in a vertical line from the support point, e.g., a ceiling beam, to the clamp, and/or to add another bend, e.g., at line Z.

The invention described herein and exemplified above can find uses in many situations where a rigid connection between a support cable or support cables and an item to be supported is required, especially where the item has substantially flat sides and bottom surfaces. The full scope of this invention, however, is to be defined by the following claims.

The invention claimed is:

1. A bracket and cable clamp combination rigidly connected to each other and intended to provide a rigid connection to an item having two transversely joined flat surfaces, the bracket being rigid and comprising four sections a first end section and a second end section, a first central section and a second central section, each section extending transversely to each adjoining section, all of the sections of the bracket being rigidly connected together and having a flat internal surface;

each of the first and second end sections including a flat internal surface extending transversely to the flat internal surface on the other end section;

the first end section including at least one opening extending fully therethrough at a location distal from the adjacent central section, and two cable openings extending fully therethrough at a location proximal to the adjacent central section, the second end section including at least two openings extending fully therethrough, the first central section of the bracket including a release opening extending fully therethrough, and the second central section, transverse to the first central section, including two cable openings extending fully therethrough;

a cable clamp having opposing primarily substantially flat end surfaces and connecting transverse side surfaces, the cable clamp fitting snugly between the flat internal surface of the first end section and the flat internal surface of the second central section of the bracket and being rigidly held in place there between;

a cable channel extending through the cable clamp and opening through each end surface of the cable clamp, a spring-loaded clamp clutch within the cable clamp and juxtaposed to the cable channel so as to grip a cable passing through the channel, and a release projection operably connected to the clamp clutch and extending transversely from the side of the clamp through the release opening for releasing the grip of the clamp clutch and so juxtaposed so as to extend through the release opening through the first central section when the clamp is rigidly held in place between the surfaces of the first end section and the first central section of the bracket;

the cable openings extending through the first end section and second central section of the bracket being aligned with the cable channel openings at the ends of the clamp when the cable clamp is rigidly held in place between the surfaces of the first end section and second central section, and the release pin extends through the release opening;

the bracket being designed and adapted to rigidly connect to flat transverse surfaces of an item to be suspended, whereby the first end surface extends under the item to support the lower surface of the item, and the second end surface is in contact with a transverse side surface of the item, such that the two surfaces can be rigidly connected to the duct surfaces while rigidly holding the cable clamp in place immediately adjacent one of the transverse sides of the item, to enable a rigid connection between the supporting cables and the suspended item when secured in place on the item.

2. The bracket and cable clamp combination of claim 1, wherein the first central and first end sections of the bracket are at right angles to each other.

3. The bracket and cable clamp combination of claim 1, wherein the cable clamp includes a pair of cable channels and a cable clamp clutch for each channel and the release opening in an elongated slot.

4. The bracket and cable clamp combination of claim 1, wherein the end surfaces of the cable clamp are parallel to each other.

5. The bracket and cable clamp combination of claim 1, comprising a convexity in one surface of each pair of mating surfaces comprising the first end and second central sections of the clamp and the respective end surface of the cable clamp and a mating internal surface formed in the other member of each pair of mating surfaces.

6. The bracket and cable clamp combination of claim 5, wherein the convexity comprises a dimple formed on each of the first end section surface and each of the second central section surface of the bracket and the internal surface is formed in each of the ends of the cable clamp.

* * * * *